UNITED STATES PATENT OFFICE.

JOHN JAMES HOOD, OF LONDON, ENGLAND.

PROCESS OF EXTRACTING GOLD OR SILVER.

SPECIFICATION forming part of Letters Patent No. 629,905, dated August 1, 1899.

Application filed January 30, 1899. Serial No. 703,925. (No specimens.)

*To all whom it may concern:*

Be it known that I, JOHN JAMES HOOD, chemist, a subject of the Queen of Great Britain, residing at 1 Fenchurch avenue, in the city of London, England, have invented certain new and useful Improvements in Processes of Extracting Gold or Silver, of which the following is a specification.

These improvements relate to the precipitation or extraction of gold from its solutions, more particularly from such solutions as are obtained in the various wet or lixiviation processes practiced for the extraction of gold from its ores, and are especially suitable for dealing with the gold solutions obtained when employing the mercury solvent described by me in United States Letters Patent No. 547,790. dated the 15th day of October, 1895. When that solvent is employed, the solutions invariably contain an excess of mercury, together with the gold and silver; and the object is to recover such excess of mercury, as well as the gold and silver, contained in the solution.

The proportion of ingredients I employ in making the precipitant may be varied; but that which I find to give satisfactory results and the method of making the incorporation are as follows: One hundred parts of zinc are melted in an ordinary iron or clay pot, to which is added a quantity of metallic antimony equal to five parts, previously melted in a separate pot. The mixture is thoroughly stirred and allowed to cool until it begins to solidify. There is then added twenty parts of metallic mercury, previously heated to nearly boiling, and the whole mixture is thoroughly stirred and poured into slabs or molds of convenient shape. In this form the zinc-antimony couple is suitable for transport.

When the precipitant is required for use, it is melted at the lowest possible temperature and granulated by pouring the melted material in a thin stream into water. The granulated alloy may then be broken up with the greatest ease to any degree of fineness necessary for the precipitation of gold.

The solution containing the gold may be either slightly alkaline or slightly acid, and it may be percolated through the precipitating material contained in boxes or similar apparatus constructed of wood or other suitable material, or the precipitating material may be contained in the form of cakes produced in a filter-press, through which the gold solution may be forced, or by other suitable means.

Such a zinc-antimony alloy, acting as a galvanic couple, forms a very active precipitant for gold, as well as for mercury. When employed in conjunction with the mercury solvent for gold already referred to, the precipitant is worked until it is well charged with mercury, resulting from the excess of the solvent used in leaching the ores. The material is taken out of its receptacle, dried, and subjected to distillation and afterward replaced for use until it is sufficiently charged with gold, when, after the final distillation to obtain the mercury, it is treated by any of the ordinary methods for recovery of the precious metals.

What I claim is—

1. A precipitant consisting of an alloy of about one hundred parts of zinc, five parts of antimony and twenty parts of mercury.

2. The process of extracting gold and silver from solutions by bringing the solutions into contact with an alloy of about one hundred parts of zinc, five parts of antimony and twenty parts of mercury.

3. The process of extracting gold, silver and mercury from solutions, by bringing the solutions into contact with an alloy of zinc, antimony and mercury, from time to time distilling off mercury from the alloy, and finally recovering the gold and silver from it.

JOHN JAMES HOOD.

Witnesses:
  ERNEST MURRAY GOLDIE,
  A. W. BRIGGS.